US 6,651,963 B1

(12) United States Patent
Kayser et al.

(10) Patent No.: US 6,651,963 B1
(45) Date of Patent: Nov. 25, 2003

(54) PORTABLE DRIVE SYSTEM

(76) Inventors: C. Edward Kayser, 1213 Northwold Dr., Lima, OH (US) 45801; Suzanne E. Kayser, 1213 Northwold Dr., Lima, OH (US) 45801

( * ) Notice: Subject to any disclaimer, the term of this patent is extended or adjusted under 35 U.S.C. 154(b) by 78 days.

(21) Appl. No.: 09/948,735

(22) Filed: Sep. 7, 2001

(51) Int. Cl.[7] .................................................. B60S 9/02
(52) U.S. Cl. ....................................... 254/420; 254/418
(58) Field of Search ......................... 74/606 R; 254/418, 254/420, DIG. 2, DIG. 4; 296/26.04, 100.05, 99.1, 156, 168, 171, 172, 173, 175, 176, 165; D12/104, 101

(56) References Cited

U.S. PATENT DOCUMENTS

| 3,735,559 | A | | 5/1973 | Touchette | 296/171 |
|---|---|---|---|---|---|
| 4,261,614 | A | | 4/1981 | Rice | 296/171 |
| 4,749,169 | A | | 6/1988 | Pickles | 254/122 |
| 4,815,786 | A | | 3/1989 | Mcray | 296/165 |
| D312,613 | S | | 12/1990 | Shichida | D13/133 |
| 5,056,661 | A | * | 10/1991 | Balzano | 206/372 |
| 5,137,235 | A | * | 8/1992 | Wentworth et al. | 248/124.1 |
| 5,445,479 | A | * | 8/1995 | Hillinger | 408/16 |
| 5,657,964 | A | * | 8/1997 | Yoshida | 254/126 |
| 5,769,485 | A | | 6/1998 | Bontrager et al. | 296/171 |
| 5,820,317 | A | * | 10/1998 | Van Troba | 408/136 |
| 5,865,499 | A | * | 2/1999 | Keyser | 296/173 |
| 5,885,036 | A | * | 3/1999 | Wheeler | 408/1 R |
| 6,484,361 | B1 | * | 11/2002 | Schmid et al. | 16/110.1 |

FOREIGN PATENT DOCUMENTS

WO    WO 9950030 A1  * 10/1999  ............. B25F/5/02

* cited by examiner

Primary Examiner—David Fenstermacher

(57) ABSTRACT

A portable drive system for automating the rotation of drive systems designed to use hand cranks. The portable drive system includes an housing designed for being held in position by a human using two hands, a drive motor positioned substantially within the housing and used to provide a rotational force for activating a drive shaft conventionally activated by a hand crank, and a drive shaft which is operationally coupled to the drive motor and extends from the housing through an aperture in the front wall of the housing.

1 Claim, 5 Drawing Sheets

PORTABLE DRIVE SYSTEM

BACKGROUND OF THE INVENTION

1. Field of the Invention

The present invention relates to electric drive systems and more particularly pertains to a new portable drive system for automating the rotation of drive systems designed to use hand cranks.

2. Description of the Prior Art

The use of electric drive systems is known in the prior art. More specifically, electric drive systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,769,485; U.S. Pat. No. 4,261,614; U.S. Pat. No. 4,815,786; U.S. Pat. No. 3,734,559; U.S. Pat. No. 4,749,169; and U.S. Pat. No. Des. 312,613.

While these devices fulfill their respective, particular objectives and requirements, the aforementioned patents do not disclose a new portable drive system. The inventive device includes an housing designed for being held in position by a human using two hands, a drive motor positioned substantially within the housing and used to provide a rotational force for activating a drive shaft conventionally activated by a hand crank, and a drive shaft which is operationally coupled to the drive motor and extends from the housing through an aperture in the front wall of the housing.

In these respects, the portable drive system according to the present invention substantially departs from the conventional concepts and designs of the prior art, and in so doing provides an apparatus primarily developed for the purpose of automating the rotation of drive systems designed to use hand cranks.

SUMMARY OF THE INVENTION

In view of the foregoing disadvantages inherent in the known types of electric drive systems now present in the prior art, the present invention provides a new portable drive system construction wherein the same can be utilized for automating the rotation of drive systems designed to use hand cranks.

The general purpose of the present invention, which will be described subsequently in greater detail, is to provide a new portable drive system apparatus and method which has many of the advantages of the electric drive systems mentioned heretofore and many novel features that result in a new portable drive system which is not anticipated, rendered obvious, suggested, or even implied by any of the prior art electric drive systems, either alone or in any combination thereof.

To attain this, the present invention generally comprises an housing designed for being held in position by a human using two hands, a drive motor positioned substantially within the housing and used to provide a rotational force for activating a drive shaft conventionally activated by a hand crank, and a drive shaft which is operationally coupled to the drive motor and extends from the housing through an aperture in the front wall of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly, from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable drive system apparatus and method which has many of the advantages of the electric drive systems mentioned heretofore and many novel features that result in a new portable drive system which is not anticipated, rendered obvious, suggested, or even implied by any of the prior art electric drive systems, either alone or in any combination thereof.

It is another object of the present invention to provide a new portable drive system which may be easily and efficiently manufactured and marketed.

It is a further object of the present invention to provide a new portable drive system which is of a durable and reliable construction.

An even further object of the present invention is to provide a new portable drive system which is susceptible of a low cost of manufacture with regard to both materials and labor, and which accordingly is then susceptible of low prices of sale to the consuming public, thereby making such portable drive system economically available to the buying public.

Still yet another object of the present invention is to provide a new portable drive system which provides in the apparatuses and methods of the prior art some of the advantages thereof; while simultaneously overcoming some of the disadvantages normally associated therewith.

Still another object of the present invention is to provide a new portable drive system for automating the rotation of drive systems designed to use hand cranks.

Yet another object of the present invention is to provide a new portable drive system which includes an housing designed for being held in position by a human using two hands, a drive motor positioned substantially within the housing and used to provide a rotational force for activating a drive shaft conventionally activated by a hand crank, and a drive shaft which is operationally coupled to the drive motor and extends from the housing through an aperture in the front wall of the housing.

Still yet another object of the present invention is to provide a new portable drive system that can be used in conjunction with existing hand driven drive systems.

Even still another object of the present invention is to provide a new portable drive system that reduces the potential of injury or muscle strain due to actuating hand crank drive systems.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
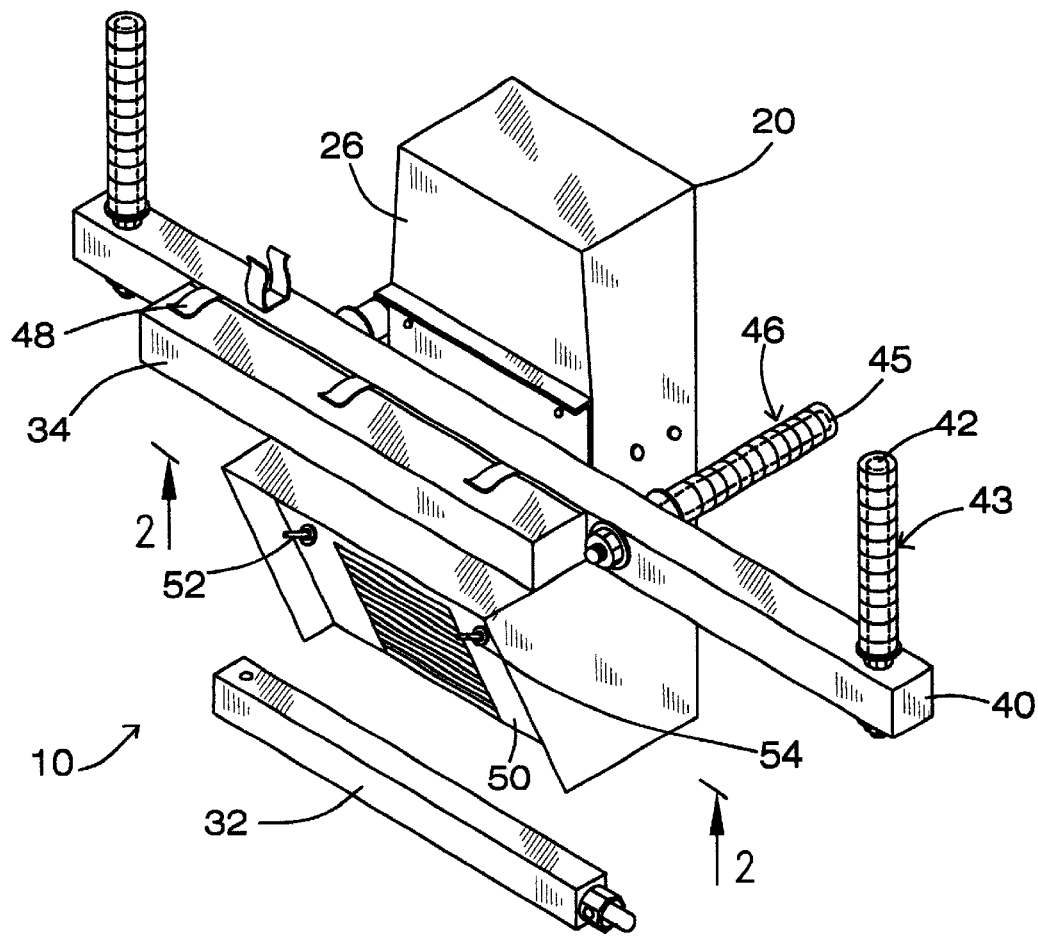
FIG. 1 is a schematic perspective top view of a new portable drive system according to the present invention.
Figure 2:
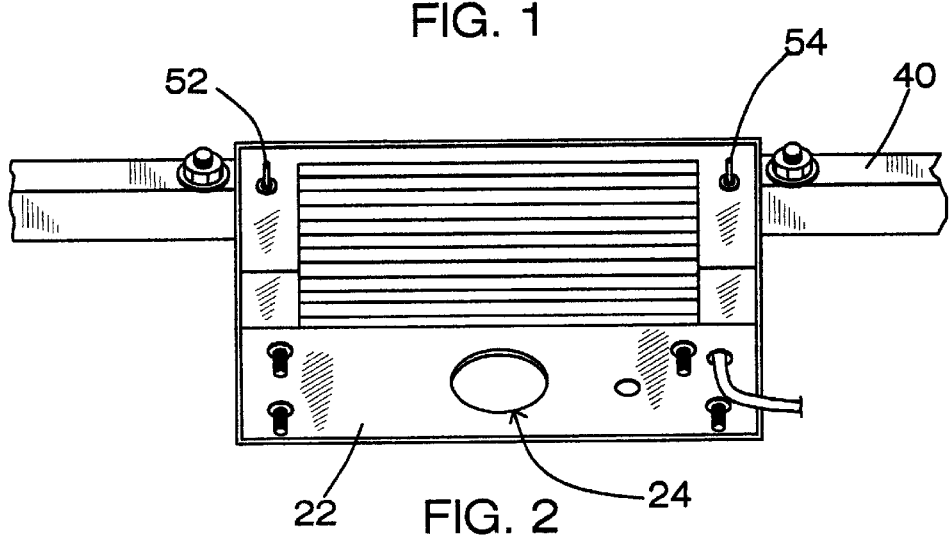
FIG. 2 is a schematic perspective front view of the present invention.
Figure 3:
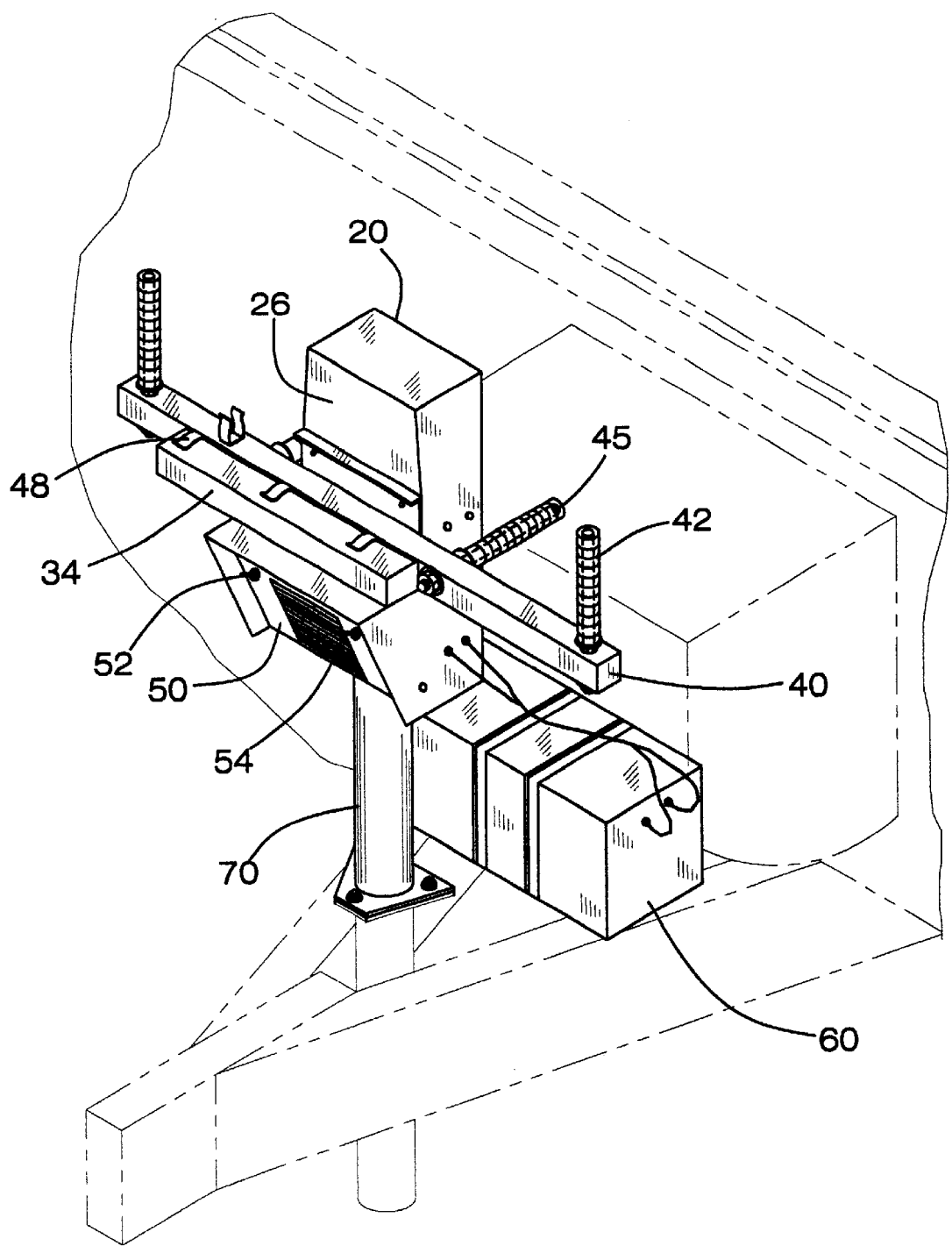
FIG. 3 is a schematic perspective view of the present invention in use in the vertical position.
Figure 4:
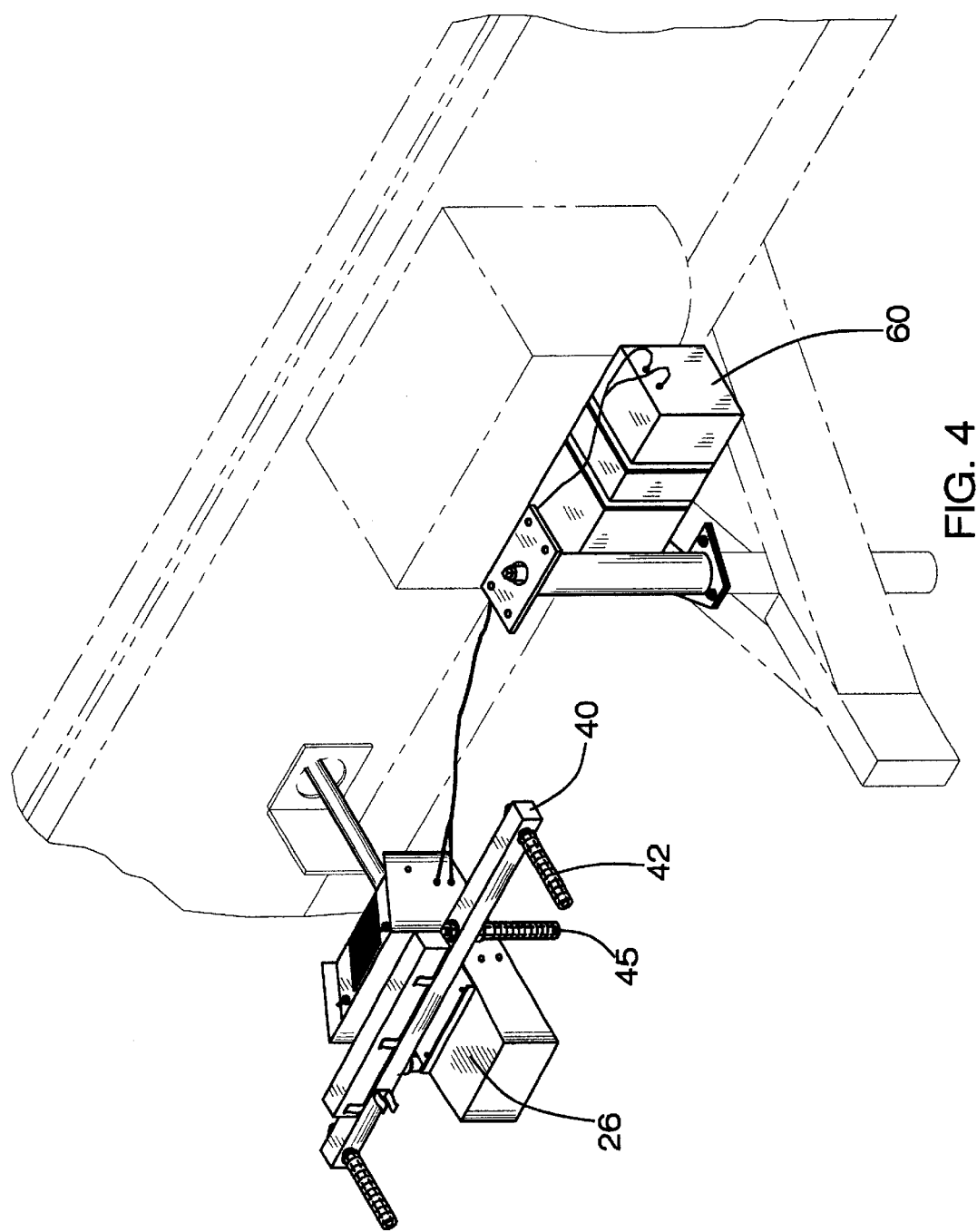
FIG. 4 is a schematic perspective view of the present invention in use in the horizontal position.
Figure 5:
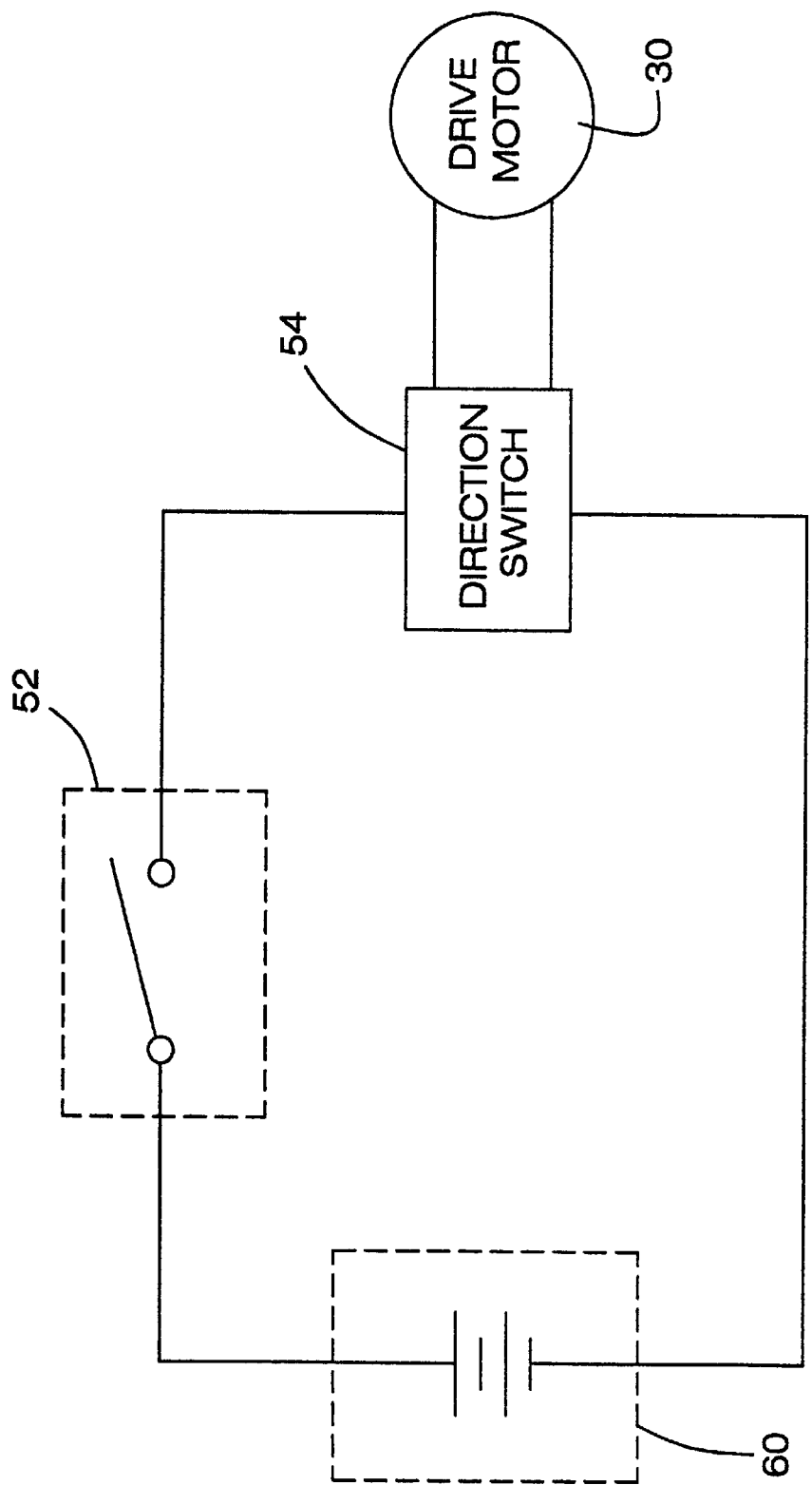
FIG. 5 is a schematic electrical block diagram view of the present invention.
Figure 6:
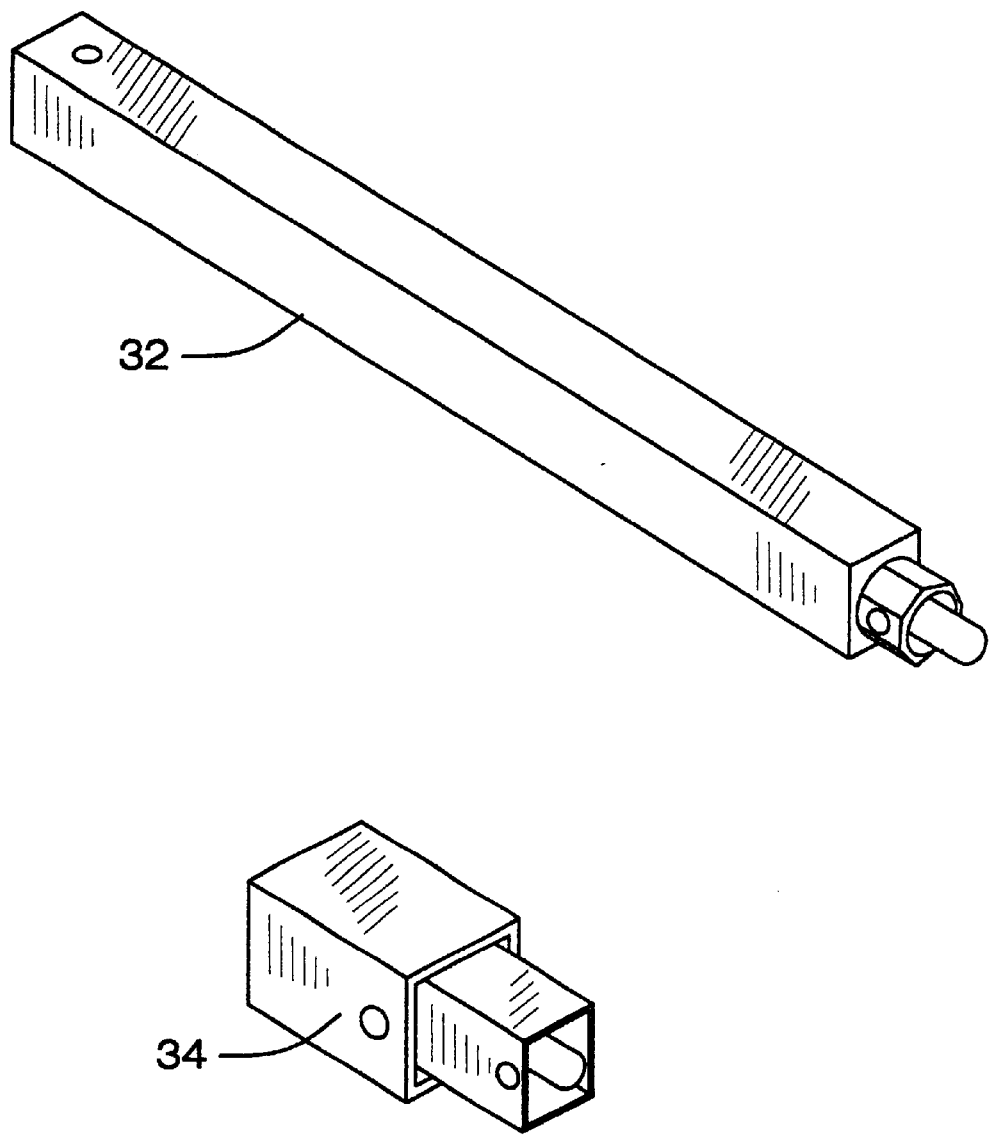
FIG. 6 is a schematic perspective view of the Drive Shaft and Shaft Extension Member units of the present invention.

With reference now to the drawings, and in particular to FIGS. 1 through 6 thereof, a new portable drive system embodying the principles and concepts of the present invention and generally designated by the reference numeral 10 will be described.

As best illustrated in FIGS. 1 through 6, the portable drive system 10 generally comprises an housing 20, a drive motor 30, a drive shaft 32, and a support bar 40.

The housing 20 is designed for being held in position by a human using two hands. The housing 20 includes a front wall 22 with an aperture 24, which extends therethrough.

The drive motor 30 is positioned substantially within the housing 20. The drive motor 30 provides a rotational force for activating an existing drive shaft, which would conventionally have been activated by a hand crank.

A drive shaft 32 is operationally coupled to the drive motor 32. The drive shaft 32 extends from the housing 20 through the aperture 24 in the front wall 22.

The support bar 40 is coupled to a top wall 26 of the housing 20. The support bar 40 extends laterally beyond the housing 20. The support bar 40 is for facilitating positioning of the portable drive system 10.

Each one of a pair of handle members 42 is positioned adjacent to an associated end of the support bar 40. Each one of the handle members 42 is positioned such that a longitudinal axis of each of the handle members 42 is substantially perpendicular to a longitudinal axis of the support bar 40. The pair of handle members 42 is for facilitating positioning the portable drive system 10 in a horizontal plane.

A grip portion 43 is applied to an outer surface of each of the handle members 42. The grip portion 43 is resiliently flexible. The grip portion 43 provides a cushioning effect to enhance the users grip on the handle member 42 and to absorb a portion of vibrations from the drive motor 30 when the portable drive system 10 is in use.

Each one of a pair of second handle members 45 is also coupled to the support bar 40. Each one of the second handle members 45 is positioned substantially adjacent to an associated side of the housing 20. Each one of the second handle members 45 is positioned such that a longitudinal axis of each one of the second handle members 45 is substantially perpendicular to both a longitudinal axis of the support bar 40 and a longitudinal axis of the pair of handle members 42. The second pair of handle members 45 is for facilitating positioning the portable drive system 10 in a vertical plane.

A second grip portion 46 is applied to an outer surface of each of the second handle members 45. The second grip portion 46 is also resiliently flexible. The second grip portion 46 provides a cushioning effect to enhance the users grip on the second handle member 45 and to absorb a portion of vibrations from the drive motor 30 when the portable drive system 10 is in use.

A plurality of clip members 48 is coupled to the support bar 40. The plurality of clip members 48 is positioned substantially opposite of the housing 20. The plurality of clip members 48 is positioned in a spaced linear array.

A shaft extension member 34 is used for extending an effective length of the drive shaft 32 or as an adapter to allow the drive shaft 32 to be coupled with additional existing drive shaft systems having unique engagement sections. The shaft extension member 34 is slideably couplable to the drive shaft 32. The shaft extension member 34 is securable to the support bar 40 by the plurality of clip members 48.

A control panel 50 is positioned adjacent to the front wall 22 of the housing 20. A power switch 52 is positioned adjacent to a first side of the control panel 50. The power switch 52 is operationally coupled to the drive motor 30. The power switch 52 includes an on position and an off position. The drive motor 30 provides rotational force when the power switch 52 is in the on position. The drive motor 30 does not provide rotational force when the power switch 52 is in the off position.

A direction switch 54 is positioned adjacent to a second side of the control panel 50. The direction switch 54 is operationally coupled to the drive motor 30. The direction switch 54 includes a forward position and a reverse position. The drive motor 30 provides rotational force in a first direction when the direction switch 54 is in the forward position. The drive motor 30 provides rotational force in a second direction when the direction switch. 54 is in the reverse position.

An electrical power source 60 is operationally coupled to the drive motor 30. The electrical power source 60 provides electrical energy to the drive motor 30. The drive motor 30 converts the electrical energy into a rotational force.

In an embodiment the electrical power source 60 comprises a 12 vdc battery and the drive motor 30 comprises a dc motor.

In another embodiment the electrical power source 60 comprises a 120 vac source, such as a household outlet and the drive motor 30 comprises a rectifier assembly and a dc motor.

A shroud member 70 can be coupled to the front panel 22. The shroud member 70 substantially encloses the drive shaft 32 and the shaft extension member 34 to prevent the user from becoming entangled with the drive shaft 32 or shaft extension member 34.

In use, the portable drive system is positioned adjacent to a existing drive mechanism adapted for using a hand crank. The portable drive is positioned such that the drive shaft of the portable drive system aligns with the drive shaft of the existing drive mechanism. The drive shaft of the portable drive system is then engaged to the drive shaft of the existing drive mechanism. The direction of rotation is selected by the user and the direction switch is placed in the proper position. The portable drive system is then turned on using the power switch and the portable drive system actuates the existing drive mechanism until shut off by the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A portable drive system comprising:

an housing adapted for being held in position by a human using two hands, said housing having a front wall with an aperture extending therethrough;

a drive motor positioned substantially within said housing;

said drive shaft operationally coupled to said drive motor, said drive shaft extending from said housing through said aperture in said front wall;

a support bar coupled to a top wall of said housing, said support bar extending laterally beyond said housing, said support bar being for facilitating positioning of said portable drive system;

a pair of handle members, each one of said handle members being positioned adjacent to an associated end of said support bar, each one of said handle members being positioned such that a longitudinal axis of each of said handle members is substantially perpendicular to a longitudinal axis of said support bar each one of said handle members being positioned such that the longitudinal axis of each of said handle members is parallel to a longitudinal axis of said drive shaft said pair of handle members being for facilitating positioning said portable drive system in a horizontal plane;

each of said handle members having a grip portion applied to an outer surface thereof said grip portion being resiliently flexible, said grip portion providing a cushioning effect to enhance the users grip on each of said handle members and to absorb a portion of vibrations from said drive motor when said portable drive system is in use;

a pair of second handle members each one of said second handle members being coupled to said support bar each one of said second handle members being positioned substantially adjacent to an associated side of said housing each one of said second handle members being positioned such that a longitudinal axis of each one of said second handle members is substantially perpendicular to both the longitudinal axis of said support bar and the longitudinal axis of the pair of handle members;

each of said second handle members having a second grip portion applied to an outer surface thereof said second grip portion being resiliently flexible, said second grip portion providing a cushioning effect to enhance the users grip on each of said second handle members and to absorb a portion of vibrations from said drive motor when said portable drive system is in use;

a plurality of clip members coupled to said support bar said plurality of clip members being positioned substantially opposite of said housing, said plurality of clip members being positioned in a spaced linear array;

a shaft extension member for extending an effective length of said drive shaft, said shaft extension member being slideably couplable to said drive shaft, said shaft extension member being securable to said support bar by said plurality of clip members;

a control panel positioned adjacent to said front wall of said housing;

a power switch positioned adjacent to a first side of said control panel said power switch being operationally coupled to said drive motor, said power switch having an on position and an off position, said drive motor providing rotational force when said power switch is in the on positions said drive motor not providing rotational force when said power switch is in the off position;

a direction switch positioned adjacent to a second side of said control panel said direction switch being operationally coupled to said drive motor, said direction switch having a forward position and a reverse position, said drive motor providing rotational force in a first direction when said direction switch is in the forward position, said drive motor providing rotational force in a second direction when said direction switch in is the reverse position;

an electrical power source operationally coupled to said drive motor, said electrical power source providing electrical energy to said drive motor, said drive motor converting said electrical energy into a rotational force;

a shroud member couplable to a front panel said shroud member substantially enclosing said drive shaft and said shaft extension member to prevent the user from becoming entangled with said drive shaft or shaft extension member;

wherein said electrical power source comprises a 12 vdc battery and said drive motor comprises a de motor.

\* \* \* \* \*